US011959615B1

(12) United States Patent
Shih

(10) Patent No.: US 11,959,615 B1
(45) Date of Patent: Apr. 16, 2024

(54) VEHICULAR LIGHTING DEVICE

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 18/463,492

(22) Filed: Sep. 8, 2023

(51) Int. Cl.

| | |
|---|---|
| ***F21S 43/20*** | (2018.01) |
| ***F21S 43/14*** | (2018.01) |
| ***F21S 43/15*** | (2018.01) |
| ***F21S 43/31*** | (2018.01) |
| ***F21V 5/00*** | (2018.01) |
| ***F21Y 105/16*** | (2016.01) |

(52) U.S. Cl.
CPC ............... *F21S 43/26* (2018.01); *F21S 43/15* (2018.01); *F21S 43/31* (2018.01); *F21V 5/007* (2013.01); *F21S 43/14* (2018.01); *F21Y 2105/16* (2016.08)

(58) Field of Classification Search
CPC ...... F21S 43/249; F21S 43/239; F21S 43/241; F21S 43/26
See application file for complete search history.

(56) References Cited

U.S. PATENT DOCUMENTS

| | | | | |
|---|---|---|---|---|
| 2016/0084469 A1* | 3/2016 | Fukui | ................. | G02B 19/0009 362/521 |
| 2017/0138557 A1* | 5/2017 | Henige | .................... | G02B 3/08 |
| 2021/0278058 A1* | 9/2021 | Muegge | .................. | F21S 43/26 |

* cited by examiner

*Primary Examiner* — Eric T Eide
(74) *Attorney, Agent, or Firm* — MUNCY, GEISSLER, OLDS & LOWE, P.C.

(57) ABSTRACT

A vehicular lighting device includes a plurality of light-emitting units and a plurality of lens units. Each of the light-emitting units includes a plurality of light-emitting subunits each of which is operable to generate light beams. Each of the lens units includes a plurality of lens subunits each of which includes a first lens and a second lens. Each of the light-emitting units corresponds to two of the lens units that are adjacent to each other. A portion of the light beams generated by the light-emitting subunits of each of the light-emitting units travels into the first lenses of the lens subunits of one of the corresponding two of the lens units such that the portion of the light beams is reflected by the first lenses of the one of the corresponding two of the lens units.

8 Claims, 10 Drawing Sheets

VEHICULAR LIGHTING DEVICE

FIELD

The present disclosure relates to a lighting device, and more particularly to a vehicular lighting device.

BACKGROUND

Referring to FIG. 1, a conventional vehicular lighting device 2 is adapted to be mounted to a rear part of a vehicle, and includes a plurality of light-emitting units 21 that may emit light beams rearwardly. The light-emitting units 21 are arranged in an array so that the vehicular lighting device 2 may display various images or texts like an advertising display board does. The images or the texts serve as messages sent by a driver of the vehicle to people right behind the vehicle (e.g., another driver in another vehicle, or pedestrians right behind the vehicle). Therefore, the driver may give signals (e.g., warnings) to the people right behind the vehicle via the conventional vehicular lighting device 2.

However, for road safety, it may be necessary to give signals to people who are at a rear right side and a rear left side of the vehicle. Unfortunately, the light-emitting units 21 may only emit the light beams rearwardly and are generally located at a same imaginary plane orthogonal to a front-rear direction. The people who are at the rear right and left sides of the vehicle may not see the signals that the driver gives via the conventional vehicular lighting device 2, and therefore road accidents may happen.

SUMMARY

Therefore, an object of the disclosure is to provide a vehicular lighting device that can alleviate the drawback of the prior art.

According to the disclosure, the vehicular lighting device includes a plurality of light-emitting units that are arranged in a left-right direction, and a plurality of lens units that are arranged in the left-right direction. Each of the light-emitting units includes a plurality of light-emitting subunits that are arranged in an up-down direction orthogonal to the left-right direction. Each of the light-emitting subunits is operable to generate light beams. The lens units and the light-emitting units are arranged in a front-rear direction orthogonal to the left-right direction and the up-down direction. Each of the lens units includes a plurality of lens subunits that are arranged in the up-down direction. Each of the lens subunits includes a first lens and a second lens that are arranged in the left-right direction. Each of the light-emitting units corresponds to two of the lens units that are adjacent to each other. Each of the light-emitting units is proximate to the first lenses of the lens subunits of one of the corresponding two of the lens units and the second lenses of the lens subunits of the other one of the corresponding two of the lens units. A portion of the light beams generated by the light-emitting subunits of each of the light-emitting units travels into the first lenses of the lens subunits of the one of the corresponding two of the lens units such that the portion of the light beams is reflected by the first lenses of the one of the corresponding two of the lens units and then exits the first lenses of the one of the corresponding two of the lens units in a first direction. A remaining portion of the light beams generated by the light-emitting subunits of each of the light-emitting units travels into the second lenses of the lens subunits of the other one of the corresponding two of the lens units such that the remaining portion of the light beams is reflected by the second lenses of the other one of the corresponding two of the lens units and then exits the second lenses of the other one of the corresponding two of the lens units in a second direction. The front-rear direction, the first direction, and the second direction cooperatively define an imaginary plane that is parallel thereto. The front-rear direction is parallel to the first direction when rotated counterclockwise by x degrees on the imaginary plane. The front-rear direction is parallel to the second direction when rotated clockwise by y degrees on the imaginary plane. Each of x and y is greater than 0 and is smaller than 90.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
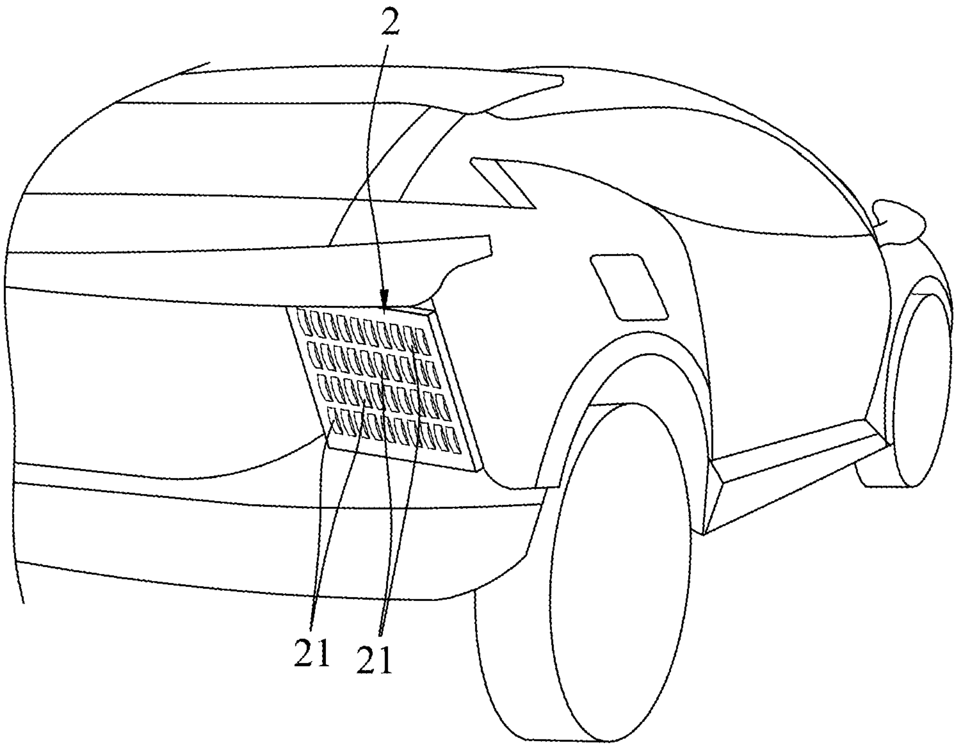
FIG.1 PRIOR ART
FIG. 1 is a fragmentary perspective view illustrating a conventional vehicular lighting device.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
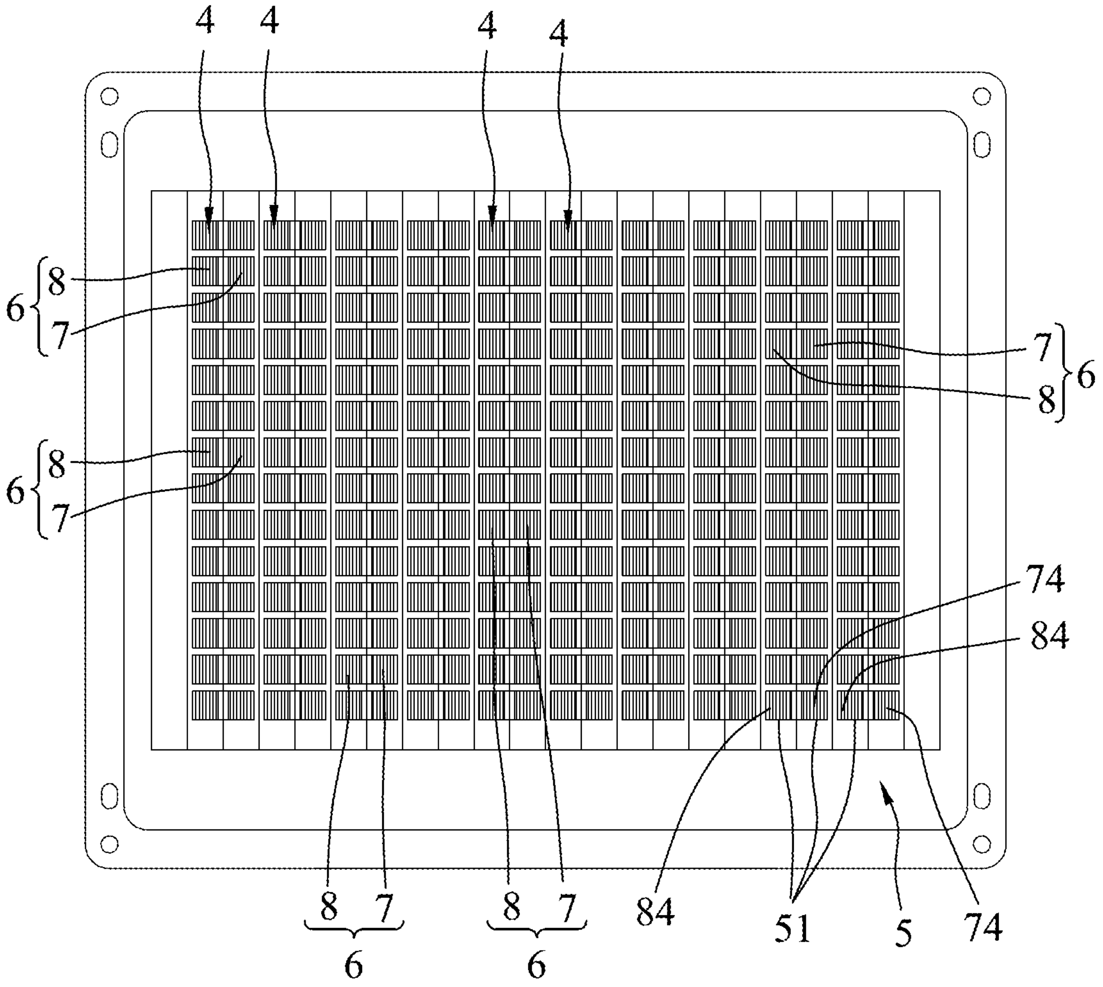
FIG. 2 is a rear view of an embodiment of a vehicular lighting device according to the disclosure.
Figure 3:
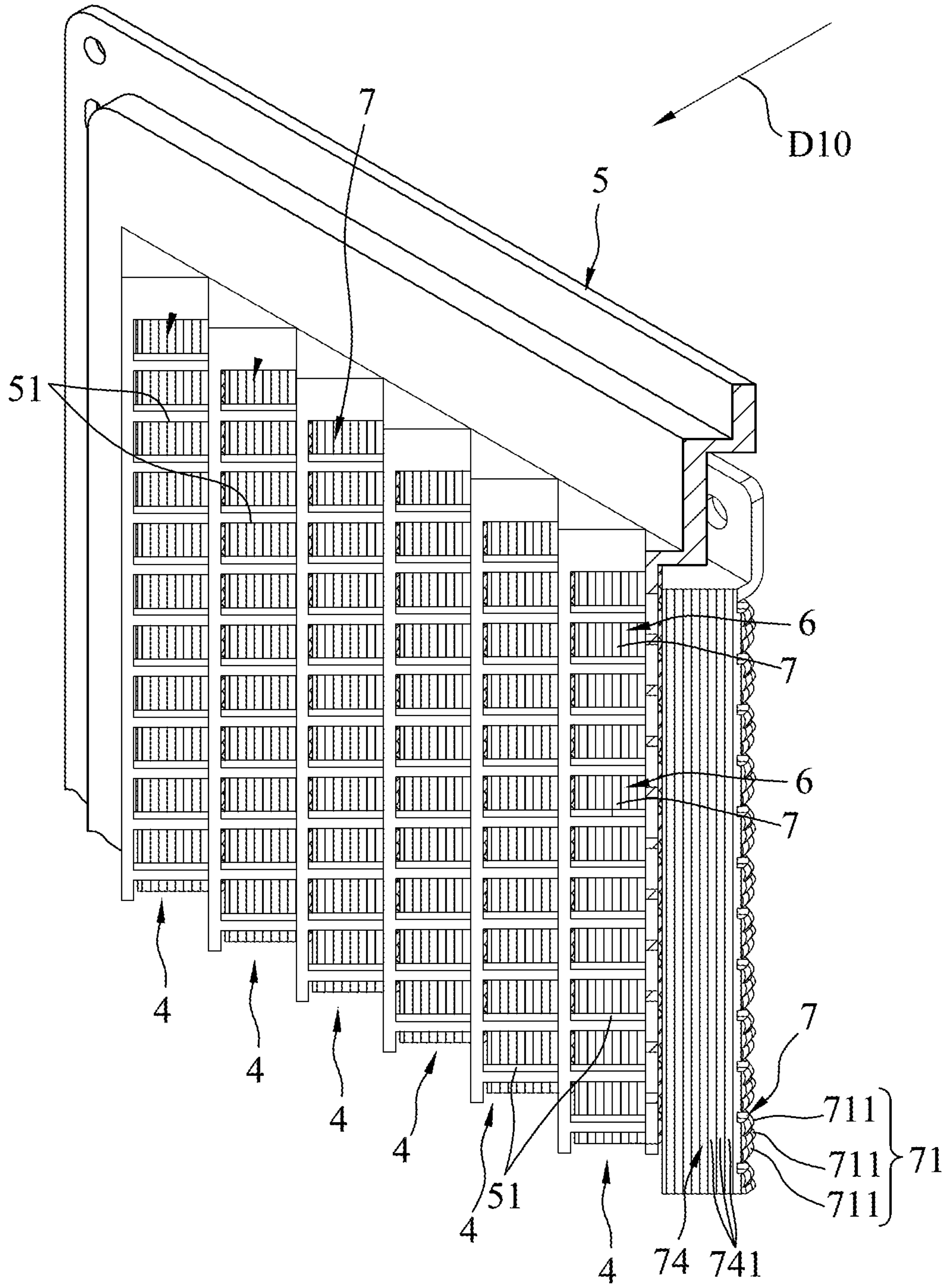
FIG. 3 is a fragmentary cutaway view illustrating a portion of the embodiment.
Figure 4:
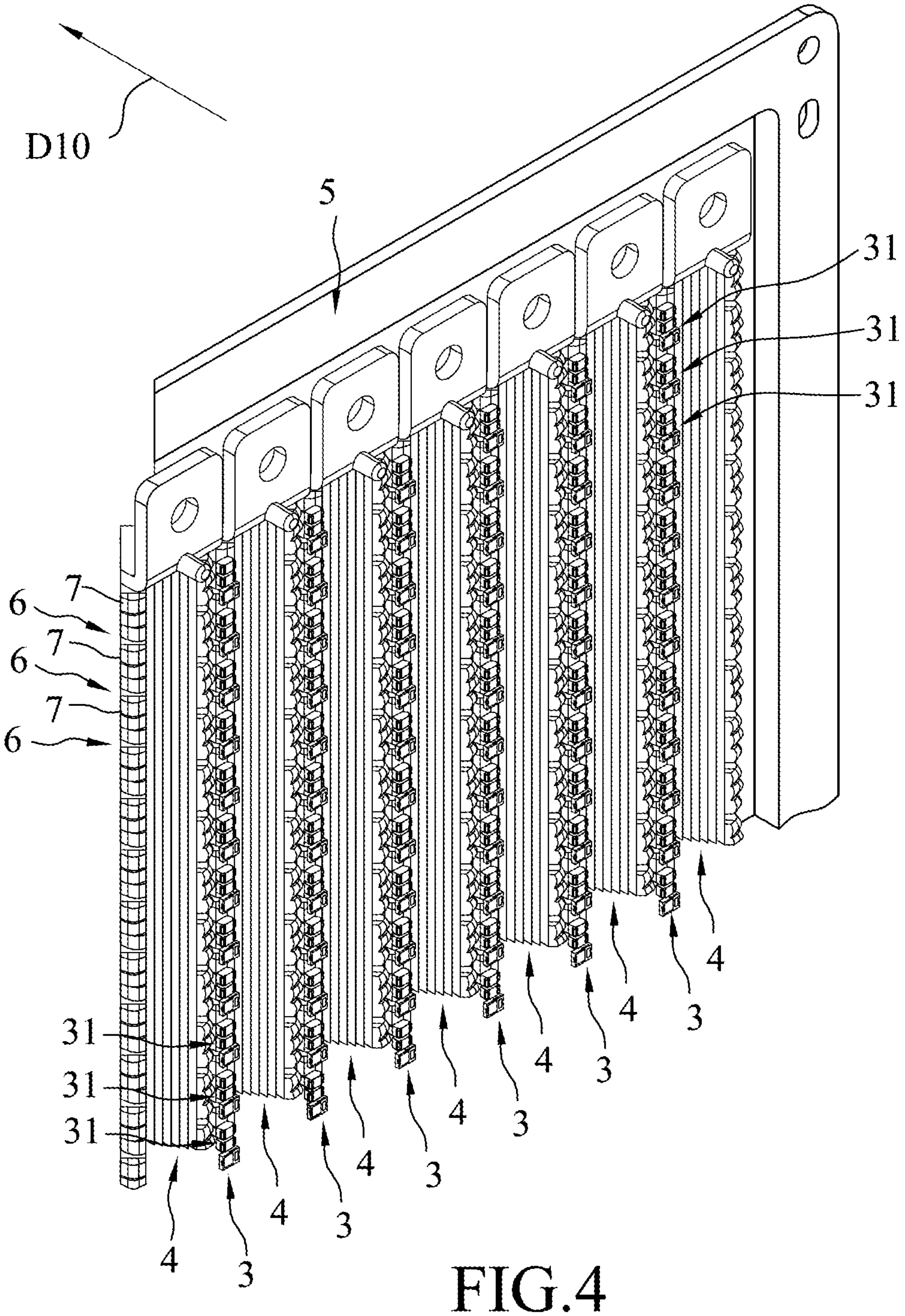
FIG. 4 is another fragmentary cutaway view illustrating the portion of the embodiment from a viewing angle different from FIG. 3.

Referring to FIGS. 2 to 4, an embodiment of a vehicular lighting device according to the disclosure includes a plurality of light-emitting units 3 that are arranged in a left-right direction and that are spaced apart from each other, a plurality of lens units 4 that are arranged in the left-right direction, and a protective cover unit 5 that covers the lens units 4. The lens units 4 and the light-emitting units 3 are arranged in a front-rear direction (D10) orthogonal to the left-right direction.

It is noted that the vehicular lighting device may be adapted to be mounted to any one of a front portion, a rear portion, a left portion, and a right portion of a vehicle.

Therefore, the front-rear direction (D10) may not be a direction parallel to an advancing direction of the vehicle. However, for clarity of description, in this disclosure, the vehicular lighting device is mounted to the rear portion of the vehicle such that the vehicular lighting device serves as a tail light of the vehicle.

In addition, each of the number of the light-emitting units 3 and the number of the lens units 4 may be adjusted according to actual requirements. For clearly illustrating a structure of the vehicular lighting device, only a portion of the vehicular lighting device (i.e., some of the light-emitting units 3 and some of the lens units 4) is shown in FIG. 5 to FIG. 7.

Figure 5:
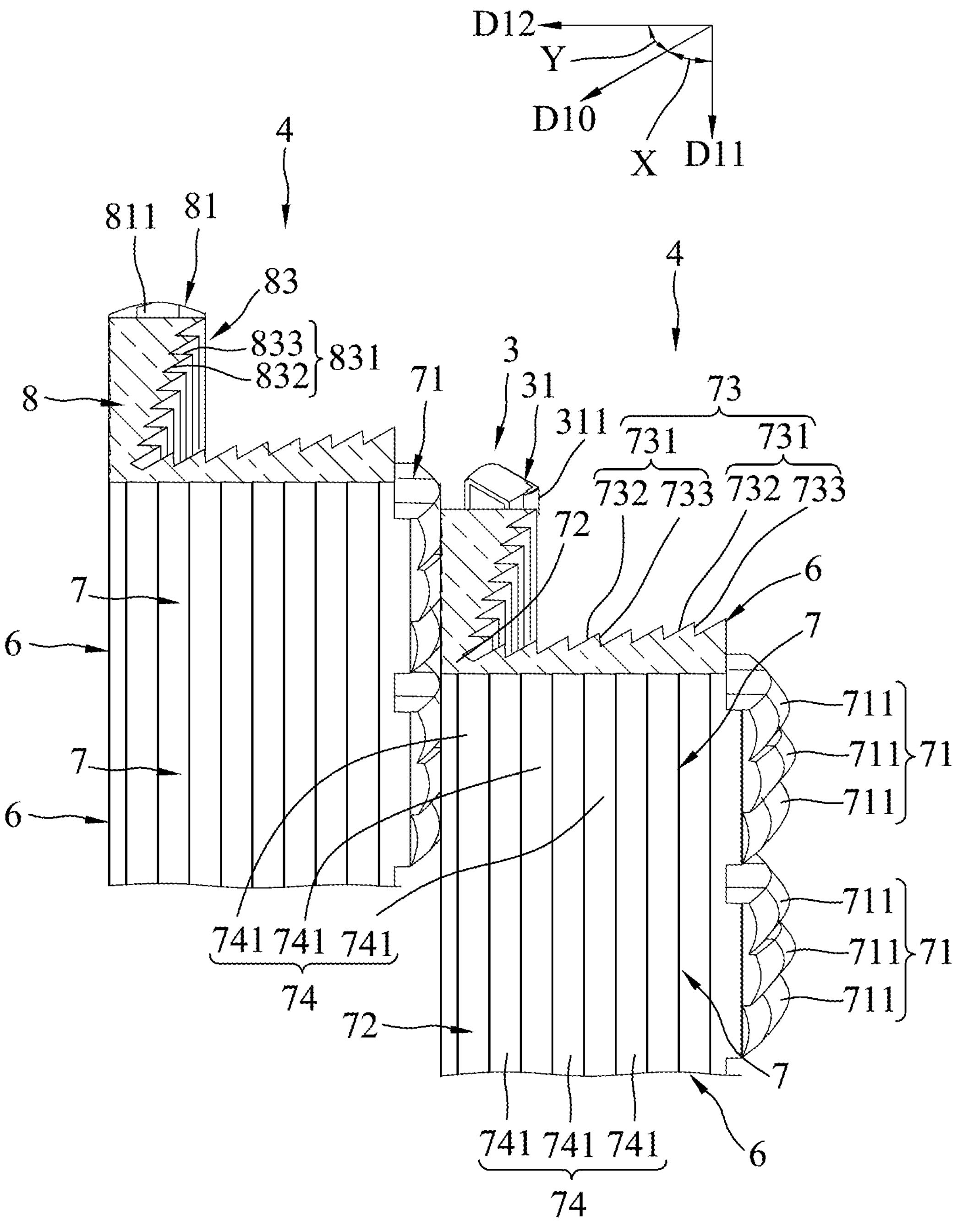
FIG. 5 is a fragmentary perspective view illustrating a light-emitting unit and lens units of the embodiment.
Figure 6:
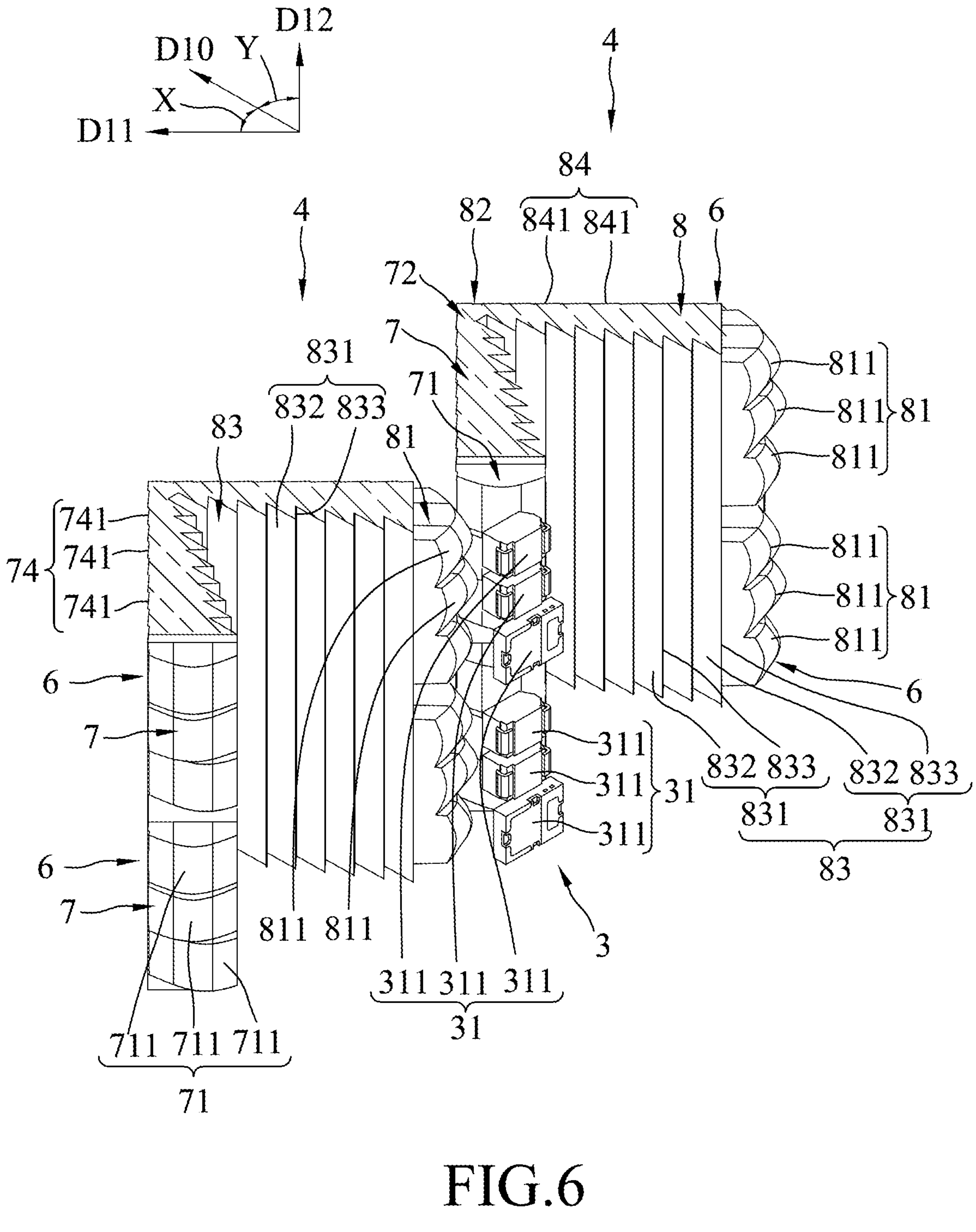
FIG. 6 is another fragmentary perspective view illustrating the light-emitting unit and the lens units of the embodiment from a viewing angle different from FIG. 5.
Figure 7:
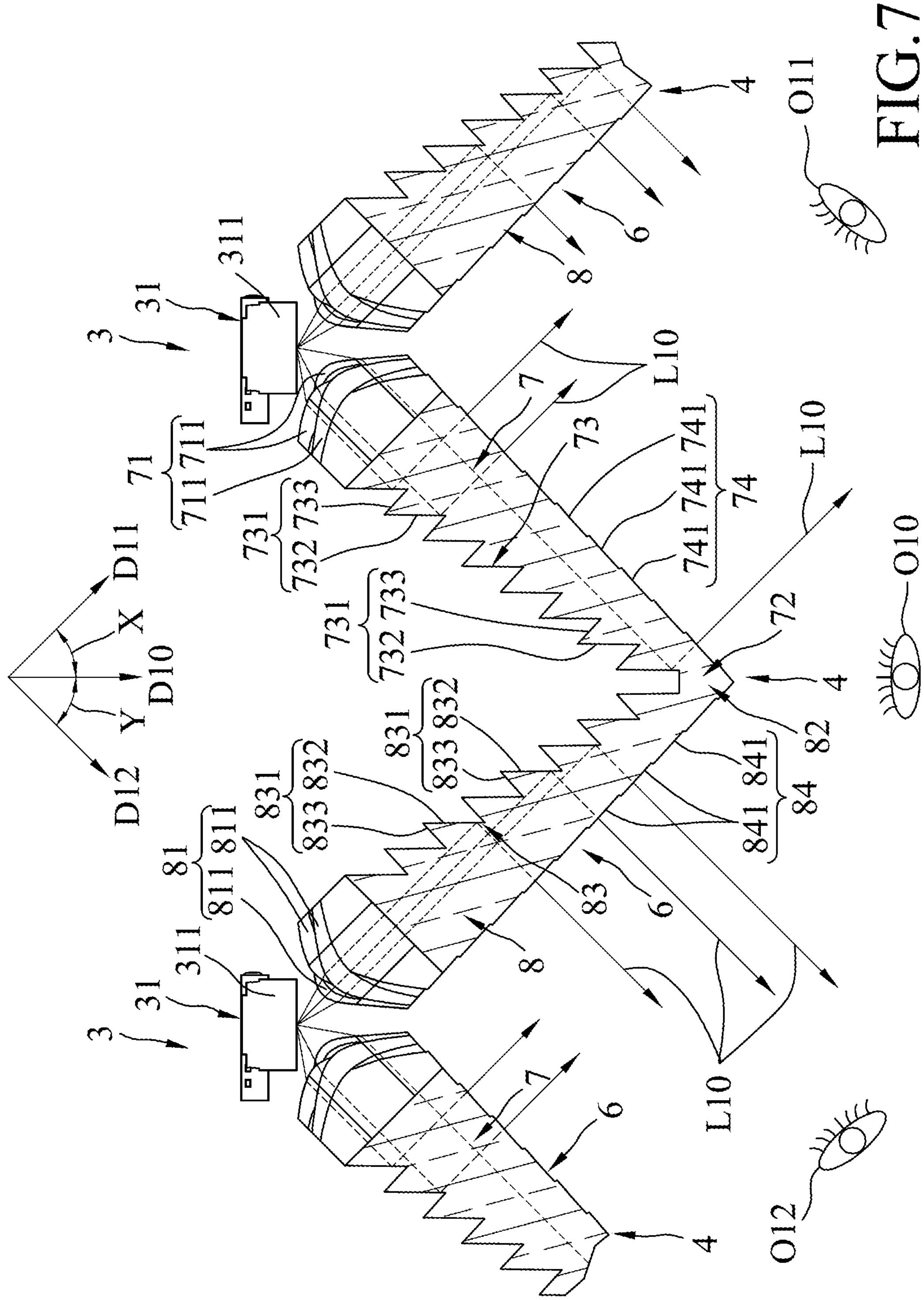
FIG. 7 is a fragmentary sectional view of the embodiment.

Referring further to FIGS. 5 to 7, each of the light-emitting units 3 includes a plurality of light-emitting subunits 31 that are arranged in an up-down direction orthogonal to the left-right direction and the front-rear direction. Each of the light-emitting subunits 31 includes three light sources 311 that are arranged in the up-down direction. Each of the light sources 311 of the light-emitting subunits 31 includes a light-emitting diode (LED) chip such that each of the light sources 311 is operable to generate light beams (L10) via the LED chip thereof. Color of the light beams (L10) that are generated by each of the light sources 311 may be red, yellow, or white. In this embodiment, the light beams (L10) that are generated by one of the light sources 311 of each of the light-emitting subunits 31 are in red, the light beams (L10) that are generated by another one of the light sources 311 of each of the light-emitting subunits 31 are in yellow, and the light beams (L10) that are generated by remaining one of the light sources 311 of each of the light-emitting subunits 31 are in white.

The lens units 4 are spaced apart from each other. Each of the lens units 4 includes a plurality of lens subunits 6 that are arranged in the up-down direction and that are integrally connected as one piece. Each of the lens subunits 6 includes a first lens 7 and a second lens 8 that are arranged in the left-right direction. Each of the light-emitting units 3 corresponds to two of the lens units 4 that are adjacent to each other. Each of the light-emitting units 3 is proximate to the first lenses 7 of the lens subunits 6 of one of the corresponding two of the lens units 4 and the second lenses 8 of the lens subunits 6 of the other one of the corresponding two of the lens units 4. Each of the light-emitting units 3 is distal from the second lenses 8 of the lens subunits 6 of the one of the corresponding two of the lens units 4 and the first lenses 7 of the lens subunits 6 of the other one of the corresponding two of the lens units 4.

A portion of the light beams (L10) generated by the light sources 311 of the light-emitting subunits 31 of each of the light-emitting units 3 travels into the first lenses 7 of the lens subunits 6 of the one of the corresponding two of the lens units 4 such that the portion of the light beams (L10) is reflected by the first lenses 7 of the one of the corresponding two of the lens units 4 and then exits the first lenses 7 of the one of the corresponding two of the lens units 4 in a first direction (D11). A remaining portion of the light beams (L10) generated by the light sources 311 of the light-emitting subunits 31 of each of the light-emitting units 3 travels into the second lenses 8 of the lens subunits 6 of the other one of the corresponding two of the lens units 4 such that the remaining portion of the light beams (L10) is reflected by the second lenses 8 of the other one of the corresponding two of the lens units 4 and then exits the second lenses 8 of the other one of the corresponding two of the lens units 4 in a second direction (D12).

The front-rear direction (D10), the first direction (D11), and the second direction (D12) cooperatively define an imaginary plane that is parallel thereto. The front-rear direction (D10) is parallel to the first direction (D11) when rotated counterclockwise by x degrees on the imaginary plane. The front-rear direction (D10) is parallel to the second direction (D12) when rotated clockwise by y degrees on the imaginary plane. Each of x and y is greater than 0 and is smaller than 90. In one embodiment, each of x and y may range from 15 to 45. In this embodiment, each of x and y is 45 (i.e., the first direction (D11) is orthogonal to the second direction (D12)) such that the first direction (D11) and the second direction (D12) are respectively defined as a rear-right direction and a rear-left direction of the vehicle. For each of the lens subunits 6, the first lens 7 is elongated in the second direction (D12), and includes a first light incident portion 71 that is distal from the second lens 8, a first connecting portion 72 that is adjacent to and connected to the second lens 8, and a first reflecting portion 73 and a first light emergent portion 74 each of which interconnects the first light incident portion 71 and the first connecting portion 72. For each of the lens subunits 6, the second lens 8 is elongated in the first direction (D11), and includes a second light incident portion 81 that is distal from the first lens 7, a second connecting portion 82 that is adjacent to and connected to the first connecting portion 72 of the first lens 7, and a second reflecting portion 83 and a second light emergent portion 84 each of which interconnects the second light incident portion 81 and the second connecting portion 82.

The light-emitting subunits 31 of each of the light-emitting units 3 respectively face the first light incident portions 71 of the first lenses 7 of the lens subunits 6 of the one of the corresponding two of the lens units 4 and respectively face the second light incident portions 81 of the second lenses 8 of the lens subunits 6 of the other one of the corresponding two of the lens units 4 so that the portion of the light beams (L10) generated by the light-emitting subunits 31 of each of the light-emitting units 3 travels into the first light incident portions 71 of the first lenses 7 of the lens subunits 6 of the one of the corresponding two of the lens units 4 and that the remaining portion of the light beams (L10) generated by the light-emitting subunits 31 of each of the light-emitting units 3 travels into the second light incident portions 81 of the second lenses 8 of the lens subunits of the other one of the corresponding two of the lens units 4.

Each of the first light incident portions 71 of the first lenses 7 of the lens subunits 6 has a plurality of first light incident surfaces 711 that are arranged in the up-down direction. For each of the first lenses 7, each of the first light incident surfaces 711 bulges away from the first connecting portion 72. The light sources 311 of each of the light-emitting units 3 respectively correspond in position to the first light incident surfaces 711 of the first lenses 7 of the lens subunits 6 of the one of the corresponding two of the lens units 4. The portion of the light beams (L10) generated by the light sources 311 of the light-emitting subunits 31 of each of the light-emitting units 3 travels through the first light incident surfaces 711 of the first light incident portions 71 of the first lenses 7 of the lens subunits 6 of the one of the corresponding two of the lens units 4 into the first light incident portions 71 of the one of the corresponding two of the lens units 4, and travels in the first light incident portions 71 of the one of the corresponding two of the lens units 4 in the second direction (D12).

The light beams (L10) that are generated by the light-emitting subunits 31 of each of the light-emitting units 3 and that travel into the first light incident portions 71 of the first lenses 7 of the lens subunits 6 of the one of the corresponding two of the lens units 4 are reflected by the first reflecting portions 73 of the first lenses 7 of the one of the corresponding two of the lens units 4 and then exit the first light emergent portions 74 of the first lenses 7 of the one of the corresponding two of the lens units 4 in the first direction (D11). The first reflecting portion 73 of each of the lens subunits 6 includes a plurality of first reflecting structures 731 that are arranged obliquely to the front-rear direction (D10) from the first light incident portion 71 to the first connecting portion 72 of the lens subunit 6. Each of the first reflecting structures 731 of the lens subunits 6 has a first reflecting surface 732, and a first connecting surface 733 that is oblique to and connected to the first reflecting surface 732. In this embodiment, the first reflecting structures 731 of each of the lens subunits 6 are arranged in the second direction (D12), each of the first reflecting surfaces 732 of the lens subunits 6 is parallel to the front-rear direction (D10) and orthogonal to the imaginary plane, and each of the first connecting surfaces 733 of the lens subunits 6 is parallel to the first direction (D11) and orthogonal to the imaginary plane. For any three adjacent ones of the first reflecting structures 731 of each of the lens subunits 6, the first reflecting surface 732 of a middle one of the three adjacent ones of the first reflecting structures 731 is connected to the first connecting surface 733 of one of remaining adjacent ones of the first reflecting structures 731, and the first connecting surface 733 of the middle one of the three adjacent ones of the first reflecting structures 731 is connected to the first reflecting surface 732 of the other one of the remaining adjacent ones of the first reflecting structures 731. The light sources 311 of each of the light-emitting units 3 respectively correspond in position to the first light incident surfaces 711 of the first lenses 7 of the lens subunits 6 of the one of the corresponding two of the lens units 4 so that the light beams (L10) that travel through the first light incident surfaces 711 into the first light incident portions 71 are reflected by the first reflecting surfaces 732 of the first reflecting portions 73. Specifically, the light beams (L10) that are generated by the light-emitting subunits 31 of each of the light-emitting units 3 and that travel into the first light incident portions 71 of the first lenses 7 of the lens subunits 6 of the one of the corresponding two of the lens units 4 are reflected by the first reflecting surfaces 732 of the first reflecting portions 73 of the first lenses 7 of the one of the corresponding two of the lens units 4 and then exit the first lenses 7 of the one of the corresponding two of the lens units 4 in the first direction (D11).

The first light emergent portion 74 of each of the lens subunits 6 has a plurality of first light emergent surfaces 741 that are arranged obliquely to the front-rear direction (D10) from the first light incident portion 71 to the first connecting portion 72 of the lens subunit 6 and that respectively correspond in position to the first reflecting surfaces 732 of the lens subunit 6. In this embodiment, the first light emergent surfaces 741 of the first light emergent portions 74 of each of the lens subunits 6 are arranged in the second direction (D12), and each of the first light emergent surfaces 741 is substantially orthogonal to the first direction (D11). Any two adjacent ones of the first light emergent surfaces 741 of each of the lens subunits 6 are unsmoothly interconnected. Referring to FIG. 7 again, the light beams (L10) that are generated by the light-emitting subunits 31 of each of the light-emitting units 3 and that travel into the first light incident portions 71 of the first lenses 7 of the lens subunits 6 of the one of the corresponding two of the lens units 4 are reflected by the first reflecting surfaces 732 of the first reflecting portions 73 of the first lenses 7 of the one of the corresponding two of the lens units 4 and then exit the first light emergent surfaces 741 of the first lenses 7 of the one of the corresponding two of the lens units 4 in the first direction (D11).

Each of the second light incident portions 81 of the second lenses 8 of the lens subunits 6 has a plurality of second light incident surfaces 811 that are arranged in the up-down direction. For each of the second lenses 8, each of the second light incident surfaces 811 bulges away from the second connecting portion 82. The light sources 311 of each of the light-emitting units 3 respectively correspond in position to the second light incident surfaces 811 of the second lenses 8 of the lens subunits 6 of the other one of the corresponding two of the lens units 4. The remaining light beams (L10) generated by the light sources 311 of the light-emitting subunits 31 of each of the light-emitting units 3 travel through the second light incident surfaces 811 of the second light incident portions 81 of the second lenses 8 of the lens subunits 6 of the other one of the corresponding two of the lens units 4 into the second light incident portions 81 of the other one of the corresponding two of the lens units 4, and travel in the second light incident portions 81 of the other one of the corresponding two of the lens units 4 in the first direction (D11).

The light beams (L10) that are generated by the light-emitting subunits 31 of each of the light-emitting units 3 and that travel into the second light incident portions 81 of the second lenses 8 of the lens subunits 6 of the other one of the corresponding two of the lens units 4 are reflected by the second reflecting portions 83 of the second lenses 8 of the other one of the corresponding two of the lens units 4 and then exit the second light emergent portions 84 of the second lenses 8 of the other one of the corresponding two of the lens units 4 in the second direction (D12). The second reflecting portion 83 of each of the lens subunits 6 includes a plurality of second reflecting structures 831 that are arranged obliquely to the front-rear direction (D10) from the second light incident portion 81 to the second connecting portion 82 of the lens subunit 6. Each of the second reflecting structures 831 of the lens subunits 6 has a second reflecting surface 832, and a second connecting surface 833 that is oblique to and connected to the second reflecting surface 832. In this embodiment, the second reflecting structures 831 of each of the lens subunits 6 are arranged in the first direction (D11), each of the second reflecting surfaces 832 of the lens subunits 6 is parallel to the front-rear direction (D10) and orthogonal to the imaginary plane, and each of the second connecting surfaces 833 of the lens subunits 6 is parallel to the second direction (D12) and orthogonal to the imaginary plane. For any three adjacent ones of the second reflecting structures 831 of each of the lens subunits 6, the second reflecting surface 832 of a middle one of the three adjacent ones of the second reflecting structures 831 is connected to the second connecting surface 833 of one of remaining adjacent ones of the second reflecting structures 831, and the second connecting surface 833 of the middle one of the three adjacent ones of the second reflecting structures 831 is connected to the second reflecting surface 832 of the other one of the remaining adjacent ones of the second reflecting structures 831. The light sources 311 of each of the light-emitting units 3 respectively correspond in position to the second light incident surfaces 811 of the second lenses 8 of the lens subunits 6 of the other one of the corresponding two of the lens units 4 so that the light beams (L10) that travel through the second light incident surfaces 811 into the second light incident portions 81 are reflected by the second reflecting surfaces 832 of the second reflecting portions 83. Specifically, the light beams (L10) that are generated by the light-emitting subunits 31 of each of the light-emitting units 3 and that travel into the second light incident portions 81 of the second lenses 8 of the lens subunits 6 of the other one of the corresponding two of the lens units 4 are reflected by the second reflecting surfaces 832 of the second reflecting portions 83 of the second lenses 8 of the other one of the corresponding two of the lens units 4 and then exit the second lenses 8 of the other one of the corresponding two of the lens units 4 in the second direction (D12).

The second light emergent portion 84 of each of the lens subunits 6 has a plurality of second light emergent surfaces 841 that are arranged obliquely to the front-rear direction (D10) from the second light incident portion 81 to the second connecting portion 82 of the lens subunit 6 and that respectively correspond in position to the second reflecting surfaces 832 of the lens subunit 6. In this embodiment, the second light emergent surfaces 841 of the second light emergent portions 84 of each of the lens subunits 6 are arranged in the first direction (D11), and each of the second light emergent surfaces 841 is substantially orthogonal to the second direction (D12). Any two adjacent ones of the second light emergent surfaces 841 of each of the lens subunits 6 are unsmoothly interconnected. Referring to FIG. 7 again, the light beams (L10) that are generated by the light-emitting subunits 31 of each of the light-emitting units 3 and that travel into the second light incident portions 81 of the second lenses 8 of the lens subunits 6 of the other one of the corresponding two of the lens units 4 are reflected by the second reflecting surfaces 832 of the second reflecting portions 83 of the second lenses 8 of the other one of the corresponding two of the lens units 4 and then exit the second light emergent surfaces 841 of the second lenses 8 of the other one of the corresponding two of the lens units 4 in the second direction (D12).

Referring to FIGS. 2 to 4 again, the protective cover unit 5 is used for protecting the lens units 4, and has a plurality of holes 51. The first and second light emitting portions 74, 84 of the lens units 4 are exposed from the holes 51 of the protective cover unit 5.

Figure 8:
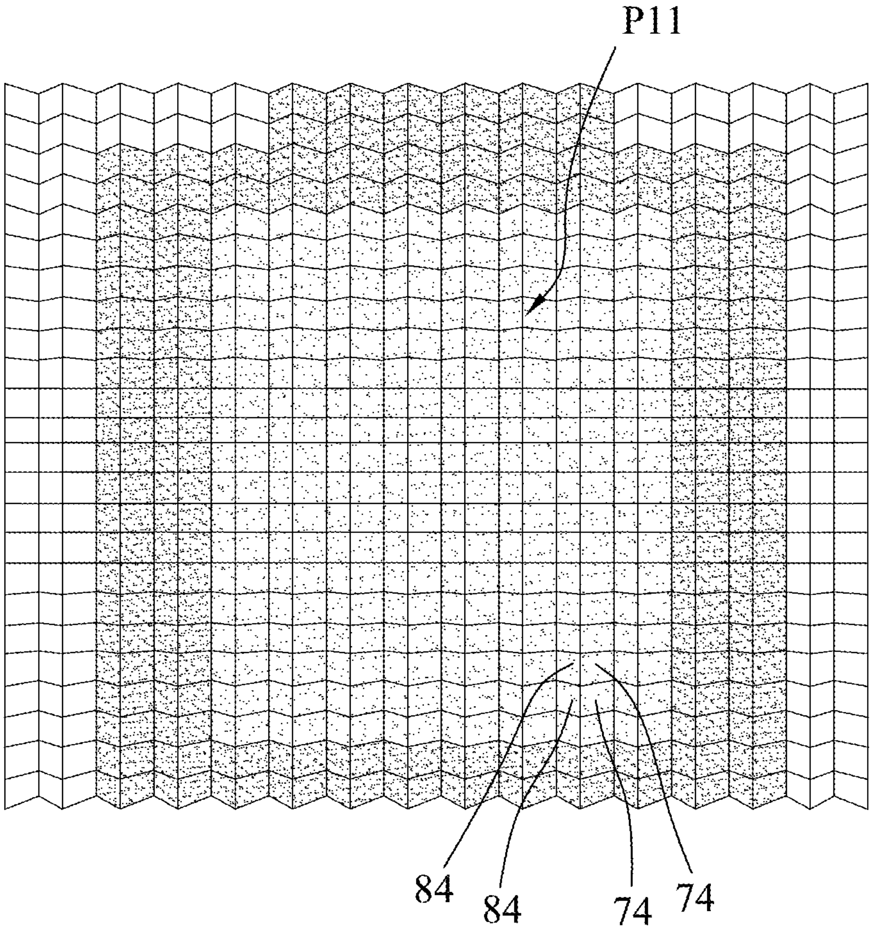
FIG. 8 is a schematic view showing an image displayed by light beams that are generated by the embodiment.

Referring further to FIG. 8, in cooperation with FIG. 7, when the vehicular light device is in operation, the portion of the light beams (L10) that are generated by the light sources 311 of the light-emitting subunits 31 of each of the light-emitting units 3 sequentially travels through the first light incident surfaces 711 into the first light incident portions 71 of the first lenses 7 of the lens subunits 6 of the one of the corresponding two of the lens units 4, travels in the first lenses 7 of the lens subunits 6 of the one of the corresponding two of the lens units 4 in the second direction (D12), reflects off the first reflecting surfaces 732 of the first reflecting portions 73 of the first lenses 7 of the one of the corresponding two of the lens units 4, and exits the first light emergent surfaces 741 of the first lenses 7 of the one of the corresponding two of the lens units 4 in the first direction (D11), and the remaining portion of the light beams (L10) that are generated by the light-emitting subunits 31 of each of the light-emitting units 3 sequentially travels through the second light incident surfaces 811 into the second light incident portions 81 of the second lenses 8 of the lens subunits 6 of the other one of the corresponding two of the lens units 4, travels in the second lenses 8 of the lens subunits 6 of the other one of the corresponding two of the lens units 4 in the second direction (D12), reflects off the second reflecting surfaces 832 of the second reflecting portions 83 of the second lenses 8 of the other one of the corresponding two of the lens units 4, and exits the second light emergent surfaces 841 of the second lenses 8 of the other one of the corresponding two of the lens units 4 in the second direction (D12). Because the vehicular lighting device serves as the tail light of the vehicle in this disclosure, the portion of the light beams (L10) exits the first light emergent surfaces 741 in the rear-right direction, and the remaining portion of the light beams (L10) exits the second light emergent surfaces 841 in the rear-left direction. When a first observer (O10) is right behind the vehicular light device, the light beams (L10) that exit the first light emergent portions 74 in the rear-right direction and the light beams (L10) that exit the second light emergent portions 84 in the rear-left direction may both reach the first observer (O10). Therefore, when the light beams (L10) generated by the vehicular lighting device display an image (P11) and when the first observer (O10) sees the image (P11), the image (P11) seen by the first observer (O10) may appear to be the same as shown in FIG. 8. In this embodiment, the image (P11) is configured to be an image of a battery.

Figure 9:
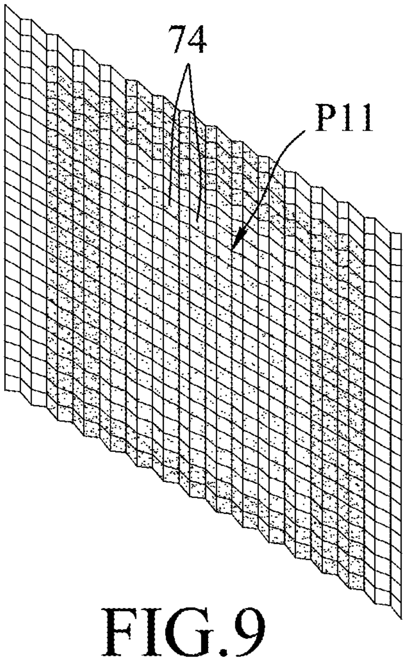
FIG. 9 is a schematic view showing the image from another viewing angle.
Figure 10:
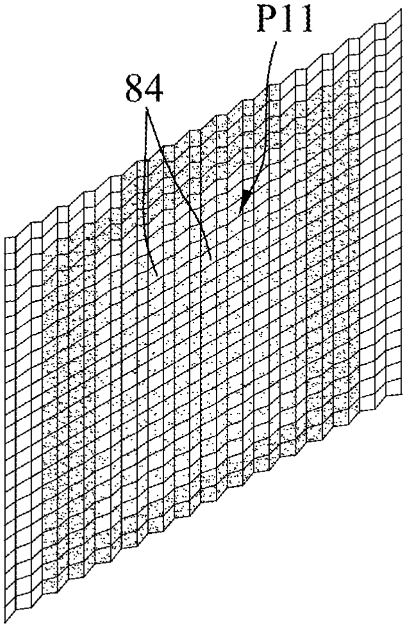
FIG. 10 is a schematic view showing the image from still another viewing angle.

Referring further to FIG. 9, in cooperation with FIG. 7, when a second observer (O11) is at a rear-right side of the vehicular light device, the light beams (L10) that exit the first light emergent portions 74 in the rear-right direction may reach the second observer (O11). Therefore, when the light beams (L10) generated by the vehicular lighting device display the image (P11), the second observer (O11) may see the image (P11) as well. The image (P11) seen by the second observer (O11) may appear to be the same as shown in FIG. 9. Even when the second observer (O11) views the image (P11) from another viewing angle, the second observer (O11) may still recognize that the image (P11) is the image of the battery. Referring further to FIG. 10, in cooperation with FIG. 7, when a third observer (O12) is at a rear-left side of the vehicular light device, the light beams (L10) that exit the second light emergent portions 84 in the rear-left direction may reach the third observer (O12). Therefore, when the light beams (L10) generated by the vehicular lighting device display the image (P11), the third observer (O12) may see the image (P11) as well. The image (P11) seen by the third observer (O12) may appear to be the same as shown in FIG. 10. Even when the third observer (O12) views the image (P11) from still another viewing angle, the third observer (O12) may still recognize that the image (P11) is the image of the battery. That is to say, all of the first, second, and third observers (O10, O11, O12) may see the image (P11) displayed by the light beams (L10) that are generated by the vehicular lighting device, and they may all recognize the same thing that the image (P11) represents. Therefore, via the vehicular lighting device, a driver of the vehicle may give signals to people right behind the vehicle, to people at a rear right side of the vehicle, and to people at a rear left side of the vehicle.

Figure 11:
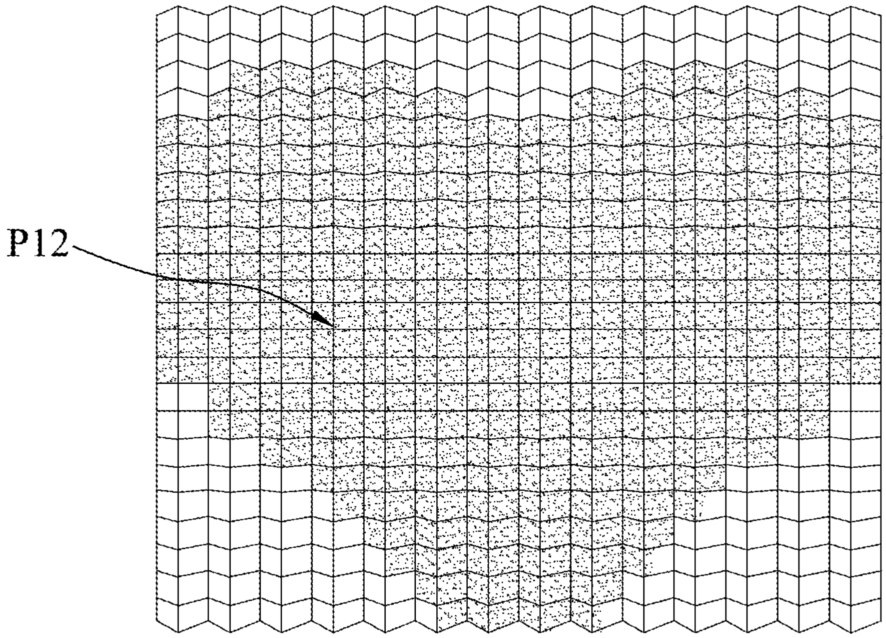
FIG. 11 is a schematic view showing another image displayed by the light beams that are generated by the embodiment.

Referring further to FIG. 11, in cooperation with FIGS. 6 and 8, by virtue of each of the light-emitting subunits 31 including a plurality of the light sources 311, by virtue of each of the first light incident portions 71 having a plurality of the first light incident surfaces 711, by virtue of each of the second light incident portions 81 having a plurality of the second light incident surfaces 811, and by virtue of the light beams (L10) being in different colors, the driver may give various signals via the vehicular lighting device. For example, the light beams (L10) may display another image (P12) as shown in FIG. 11. It is noted that, the vehicular lighting device is operable to stop generating some of the light beams (L10) so that the another image (P12) may be configured to be an image of a heart, and is operable to stop generating the light beams (L10) that are in white and yellow so that the heart image may be in red. The vehicular lighting device may be operable to display various images and various texts by stopping generating some of the light beams (L10). In addition, the light sources 311 may be operable to generate the light beams (L10) in different sequences so that the light beams (L10) may display moving images, and that the vehicular lighting device may serve as a news ticker or an LED scrolling display.

In summary, advantages of the vehicular lighting device include that the light beams (L10) exit the vehicular lighting device in the first and second directions (D11, D12) instead of the front-rear direction (D10) so that the people right behind the vehicle, at the rear-right side of the vehicle, and at the rear-left side of the vehicle may all see the signals that the driver gives via the vehicular lighting device. Road safety may thus be improved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicular lighting device comprising:

a plurality of light-emitting units arranged in a left-right direction, each of said light-emitting units including a plurality of light-emitting subunits that are arranged in an up-down direction orthogonal to the left-right direction, each of said light-emitting subunits being operable to generate light beams; and a plurality of lens units arranged in the left-right direction, said lens units and said light-emitting units being arranged in a front-rear direction orthogonal to the left-right direction and the up-down direction, each of said lens units including a plurality of lens subunits that are arranged in the up-down direction, each of said lens subunits including a first lens and a second lens that are arranged in the left-right direction, each of said light-emitting units corresponding to two of said lens units that are adjacent to each other, each of said light-emitting units being proximate to said first lenses of said lens subunits of one of the corresponding two of said lens units and said second lenses of said lens subunits of the other one of the corresponding two of said lens units, a portion of the light beams generated by said light-emitting subunits of each of said light-emitting units traveling into said first lenses of said lens subunits of the one of the corresponding two of said lens units such that the portion of the light beams is reflected by said first lenses of the one of the corresponding two of said lens units and then exits said first lenses of the one of the corresponding two of said lens units in a first direction, a remaining portion of the light beams generated by said light-emitting subunits of each of said light-emitting units traveling into said second lenses of said lens subunits of the other one of the corresponding two of said lens units such that the remaining portion of the light beams is reflected by said second lenses of the other one of the corresponding two of said lens units and then exits said second lenses of the other one of the corresponding two of said lens units in a second direction, the front-rear direction, the first direction, and the second direction cooperatively defining an imaginary plane that is parallel thereto, the front-rear direction being parallel to the first direction when rotated counterclockwise by x degrees on the imaginary plane, the front-rear direction being parallel to the second direction when rotated clockwise by y degrees on the imaginary plane, each of x and y being greater than 0 and smaller than 90.

2. The vehicular lighting device as claimed in claim 1, wherein:

for each of said lens subunits, said first lens includes a first light incident portion that is distal from said second lens, a first connecting portion that is adjacent to and connected to said second lens, and a first reflecting portion and a first light emergent portion each of which interconnects said first light incident portion and said first connecting portion;

for each of said lens subunits, said second lens includes a second light incident portion that is distal from said first lens, a second connecting portion that is adjacent to and connected to said first lens, and a second reflecting portion and a second light emergent portion each of which interconnects said second light incident portion and said second connecting portion;

said light-emitting subunits of each of said light-emitting units respectively face said first light incident portions of said first lenses of said lens subunits of the one of the corresponding two of said lens units and respectively face said second light incident portions of said second lenses of said lens subunits of the other one of the corresponding two of said lens units so that the portion of the light beams generated by said light-emitting subunits of each of said light-emitting units travels into said first light incident portions of said first lenses of said lens subunits of the one of the corresponding two of said lens units and that the remaining portion of the light beams generated by said light-emitting subunits of each of said light-emitting units travels into said second light incident portions of said second lenses of said lens subunits of the other one of the corresponding two of said lens units;

the light beams that are generated by said light-emitting subunits of each of said light-emitting units and that travel into said first light incident portions of said first lenses of said lens subunits of the one of the corresponding two of said lens units are reflected by said first reflecting portions of said first lenses of the one of the corresponding two of said lens units and then exit said first light emergent portions of said first lenses of the one of the corresponding two of said lens units in the first direction; and the light beams that are generated by said light-emitting subunits of each of said light-emitting units and that travel into said second light incident portions of said second lenses of said lens subunits of the other one of the corresponding two of said lens units are reflected by said second reflecting portions of said second lenses of the other one of the corresponding two of said lens units and then exit said second light emergent portions of said second lenses of the other one of the corresponding two of said lens units in the second direction.

3. The vehicular lighting device as claimed in claim 2, wherein said first reflecting portion of each of said lens subunits includes a plurality of first reflecting structures that are arranged obliquely to the front-rear direction from said first light incident portion to said first connecting portion of said lens subunit, each of said first reflecting structures of said lens subunits having a first reflecting surface and a first connecting surface that is oblique to and connected to said first reflecting surface, the light beams that are generated by said light-emitting subunits of each of said light-emitting units and that travel into said first light incident portions of said first lenses of said lens subunits of the one of the corresponding two of said lens units being reflected by said first reflecting surfaces of said first reflecting portions of said first lenses of the one of the corresponding two of said lens units and then exiting said first lenses of the one of the corresponding two of said lens units in the first direction; and said second reflecting portion of each of said lens subunits includes a plurality of second reflecting structures that are arranged obliquely to the front-rear direction from said second light incident portion to said second connecting portion of said lens subunit, each of said second reflecting structures of said lens subunits having a second reflecting surface and a second connecting surface that is oblique to and connected to said second reflecting surface, the light beams that are generated by said light-emitting subunits of each of said light-emitting units and that travel into said second light incident portions of said second lenses of said lens subunits of the other one of the corresponding two of said lens units being reflected by said second reflecting surface of said second reflecting portions of said second lenses of the other one of the corresponding two of said lens units and then exiting said second lenses of the other one of the corresponding two of said lens units in the second direction.

4. The vehicular lighting device as claimed in claim 3, wherein said first light emergent portion of each of said lens subunits has a plurality of first light emergent surfaces that are arranged obliquely to the front-rear direction from said first light incident portion to said first connecting portion of said lens subunit and that respectively correspond in position to said first reflecting surfaces of said lens subunit, any two adjacent ones of said first light emergent surfaces of each of said lens subunits being unsmoothly interconnected, the light beams that are generated by said light-emitting subunits of each of said light-emitting units and that travel into said first light incident portions of said first lenses of said lens subunits of the one of the corresponding two of said lens units being reflected by said first reflecting surfaces of said first reflecting portions of said first lenses of the one of the corresponding two of said lens units and then exiting said first light emergent surfaces of said first lenses of the one of the corresponding two of said lens units in the first direction; and said second light emergent portion of each of said lens subunits has a plurality of second light emergent surfaces that are arranged obliquely to the front-rear direction from said second light incident portion to said second connecting portion of said lens subunit and that respectively correspond in position to said second reflecting surfaces of said lens subunit, any two adjacent ones of said second light emergent surfaces of each of said lens subunits being unsmoothly interconnected, the light beams that are generated by said light-emitting subunits of each of said light-emitting units and that travel into said second light incident portions of said second lenses of said lens subunits of the other one of the corresponding two of said lens units being reflected by said second reflecting surfaces of said second reflecting portions of said second lenses of the other one of the corresponding two of said lens units and then exiting said second light emergent surfaces of said second lenses of the other one of the corresponding two of said lens units in the second direction.

5. The vehicular lighting device as claimed in claim 4, wherein each of said light-emitting subunits includes a plurality of light sources that are arranged in the up-down direction, each of said first light incident portions having a plurality of first light incident surfaces that are arranged in the up-down direction, for each first lens, each of said first light incident surfaces bulging away from said first connecting portion, said light sources of each of said light-emitting units respectively corresponding in position to said first light incident surfaces of said first lenses of said lens subunits of the one of the corresponding two of said lens units so that the light beams that travel through said first light incident surfaces into said first light incident portions are reflected by said first reflecting surfaces of said first reflecting portions; and each of said second light incident portions has a plurality of second light incident surfaces that are arranged in the up-down direction, for each second lens, each of said second light incident surfaces bulging away from said second connecting portion, said light sources of each of said light-emitting units respectively corresponding in position to said second light incident surfaces of said second lenses of said lens subunits of the other one of the corresponding two of said lens units so that the light beams that travel through said second light incident surfaces into said second light incident portions are reflected by said second reflecting surfaces of said second reflecting portions.

6. The vehicular lighting device as claimed in claim 4, wherein each of x and y is 45.

7. The vehicular lighting device as claimed in claim 6, wherein each of said first reflecting surfaces of said lens subunits is parallel to the front-rear direction and orthogonal to the imaginary plane, each of said first connecting surfaces of said lens subunits being parallel to the first direction and orthogonal to the imaginary plane, each of said second reflecting surfaces of said lens subunits being parallel to the front-rear direction and orthogonal to the imaginary plane, each of said second connecting surfaces of said lens subunits being parallel to the second direction and orthogonal to the imaginary plane.

8. The vehicular lighting device as claimed in claim 7, wherein said first light emergent surfaces of said first light emergent portion of each of said lens subunits are arranged in the second direction, said second light emergent surfaces of said second light emergent portion of each of said lens subunits being arranged in the first direction.

* * * * *